(12) United States Patent
Chowdhury

(10) Patent No.: US 7,326,285 B2
(45) Date of Patent: Feb. 5, 2008

(54) METHODS FOR RECOVERING HYDROCARBON VAPORS

(75) Inventor: Ajit Chowdhury, Madison, WI (US)

(73) Assignee: RMT, Inc., Madison, WI (US)

( * ) Notice: Subject to any disclaimer, the term of this patent is extended or adjusted under 35 U.S.C. 154(b) by 416 days.

(21) Appl. No.: 11/135,700

(22) Filed: May 24, 2005

(65) Prior Publication Data

US 2006/0266215 A1 Nov. 30, 2006

(51) Int. Cl.
*B01D 53/14* (2006.01)
*F17C 13/00* (2006.01)

(52) U.S. Cl. .......................... 96/243; 96/275

(58) Field of Classification Search ............... 96/155, 96/234, 275, 290, 323, 243, 271–274; 95/172, 95/237
See application file for complete search history.

(56) References Cited

U.S. PATENT DOCUMENTS

| | | | |
|---|---|---|---|
| 1,652,171 A | 12/1927 | Huff et al. | |
| 2,371,010 A | 3/1945 | Wolfner | |
| 4,422,301 A * | 12/1983 | Watt et al. | 62/48.2 |
| 4,568,356 A | 2/1986 | Chambers | |
| 4,994,094 A | 2/1991 | Behling et al. | |
| 5,032,260 A | 7/1991 | Alzner | |
| 5,195,587 A | 3/1993 | Webb | |
| 5,325,896 A | 7/1994 | Koch et al. | |
| 5,367,882 A | 11/1994 | Lievens et al. | |
| 5,516,119 A | 5/1996 | Trackwell et al. | |
| 5,537,911 A | 7/1996 | Ohirogge et al. | |
| 5,863,128 A | 1/1999 | Mazzei | |
| 6,059,856 A | 5/2000 | Ohirogge et al. | |
| 6,315,000 B1 | 11/2001 | Goodyear | |
| 6,418,957 B1 | 7/2002 | Goodyear | |
| 6,659,143 B1 | 12/2003 | Taylor et al. | |

OTHER PUBLICATIONS

Air & Waste Management Association. Air Pollution Engineering Manual. AJ Buonicore (Editor), Wayne T. Davis (Editor), 1992, 341-345, Van Nostrand Reinhold, New York, NY.

* cited by examiner

*Primary Examiner*—Frank M. Lawrence
(74) *Attorney, Agent, or Firm*—Quarles & Brady LLP

(57) ABSTRACT

Vapor recovery systems and methods are disclosed in association with a denatured alcohol production system. Hydrocarbon vapors are miscible in a motive fluid that captures the vapors and forms a hydrocarbon-alcohol solution. The recovered hydrocarbons are not removed from the solution, but are used in production of the denatured alcohol.

7 Claims, 3 Drawing Sheets

METHODS FOR RECOVERING HYDROCARBON VAPORS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to methods and devices for recovering hydrocarbon vapors. The vapors can contain ozone-destroying volatile organic compounds ("VOC"), carcinogenic agents such as benzene and formaldehyde, as well as other components. As a result, release of hydrocarbon vapors is subject to regulation by federal and state governments.

The invention finds applicability in association with an apparatus for producing, storing, or transporting a hydrocarbon-denatured alcohol that is suited for use as a fuel but which is rendered unfit for human consumption by addition of non-potable hydrocarbons. Conventionally, denatured alcohol is stored in a tank having either a fixed roof or a floating roof and is then transported in a container to a distribution center or to a point of sale. Hydrocarbon-containing vapors released from the denatured alcohol can accumulate in a headspace of the storage tank or the transport container. Such vapors can also accumulate in containers that transport, or that have transported hydrocarbons, for example to or from facilities that produce the denatured alcohol. The tanks and the containers can release hydrocarbon vapors into the environment when inflowing liquid displaces the vapors. The invention also finds applicability in recovery of vapors from an hydrocarbon storage tank, such as a gasoline storage tank, which can be above or below ground level.

Known vapor recovery and control methods include vapor balancing, flaring and condensation. Vapor recovery systems in which a motive fluid entrains contaminant vapors in a jet pump or eductor are known, but in such systems the reaction byproduct or contaminant vapors are recovered from the motive fluid for recycling, reuse or resale. As such, the vapors are immiscible in, and remain physically and chemically separate from, the motive fluid, thereby permitting recovery of the entrained vapors from the fluid. A need remains, however, for an environmentally sound vapor recovery system that avoids the known prior systems, which are inapplicable to the denatured alcohol fuel systems for the reasons noted above. A desirable vapor recovery system would be tailored for use in the production, storage and transport of denatured alcohol.

SUMMARY OF THE INVENTION

The present invention relates to environmentally sound diversion and recovery of hydrocarbon vapors from a source of the vapors. Advantageously, the vapors are miscible (soluble) in an alcohol used in the recovery. In accord with the invention, the vapors are not released into the environment or flared, but rather are dissolved in the alcohol.

In a first aspect, the invention is summarized in that a method for recovering hydrocarbon vapors from at least one vapor source includes the steps of contacting the hydrocarbon vapors with at least one alcohol in which the hydrocarbons are miscible, such that the hydrocarbons dissolve in the alcohol to produce a hydrocarbon-containing alcohol solution and venting non-condensable insoluble gases from the hydrocarbon-containing alcohol solution to produce a hydrocarbon-containing alcohol solution depleted of insoluble gases. The latter solution is advantageously used in an associated method for making either a denatured alcohol or for making an alcohol-containing hydrocarbon mixture, as is described elsewhere herein. In the method for making a denatured alcohol, the latter solution is combined with an additional amount of at least one of a hydrocarbon mixture (such as gasoline) and the alcohol to produce a denatured alcohol solution containing a pre-determined concentration of the hydrocarbons in the alcohol. The relative concentrations are maintained such that substantially all of the vapors sought to be dissolved in the alcohol are dissolved in the alcohol. The skilled person can calculate a desired component ratio and can adjust inflows of alcohol and denatured alcohol to the tanks to maintain the desired ratio.

In another related aspect, the invention is summarized in that an apparatus for recovering hydrocarbon vapors in a motive alcohol liquid for recycling includes a gas-liquid contact device (e.g., an eductor, such as a Venturi eductor, a co-current flow absorber, a counter-current flow absorber, or any other device that facilitates gas-liquid contact), a storage container in fluid communication with the gas-liquid contact device for storing the hydrocarbon-containing alcohol solution and a vent for venting the non-condensable insoluble gases from the hydrocarbon-containing alcohol solution to the environment.

The gas-liquid contact device brings the vapors into contact with the alcohol such that the vapors dissolve in the alcohol to produce the hydrocarbon-containing alcohol solution. The gas-liquid contact device includes a first inlet for providing the alcohol fluid from an alcohol source in fluid communication with the first inlet into the device, a second inlet for providing the hydrocarbon vapor from a vapor source in fluid communication with the second inlet into the device, and a first outlet in fluid communication with the storage tank inlet.

The liquid passing through the gas-liquid contact device can advantageously be cooled and maintained at a temperature below ambient temperature such that residual hydrocarbon and alcohol in vapor phase are condensed and does not vent to the environment. To promote additional condensation, the vent can be cooled to maintain a temperature below ambient temperature. In some embodiments of the apparatus, such as when the storage container has a fixed roof that defines a headspace above the solution, the vent can be provided in the roof of the container. In other embodiments, such as when the storage tank has a floating roof, the vent can be provided in an optional in-line separator provided in fluid communication with both the gas-liquid contact device and the storage container, such that the solution flows from the contact device through the separator (from which the non-condensable insoluble gases can vent) to the storage container.

In embodiments having a separator, the separator includes, in addition to the vent, a first inlet from the gas-liquid contact device, a second inlet from a source of the alcohol, and a first outlet for conveying the denatured alcohol to a destination. The optional separator optionally includes a second outlet in fluid communication with the first inlet to the gas-liquid contact device, in which case the separator can be an alcohol source for the contact device.

When the gas-liquid contact device is an eductor, the first and second inlets are in fluid communication with an internal mixing chamber for receiving and mixing the alcohol fluid and the hydrocarbon vapors to form an alcohol solution containing the dissolved hydrocarbons. The first and second inlets are positioned and sized to deliver the alcohol to the mixing chamber at a pressure higher than that at which the hydrocarbon vapor is delivered to the mixing chamber.

In another related aspect, the invention is further summarized in that the vapor source can be a headspace in a fixed or mobile vessel that contains or contained the hydrocarbon vapors, for example, either by carrying or having carried at least one of a hydrocarbon fluid (e.g., gasoline or petroleum crude oil) and a denatured alcohol. A fixed vessel can be, e.g., a denatured alcohol storage tank or a hydrocarbon storage tank. A mobile vessel can be, e.g., a tanker truck, rail tank car, or ship that carries the hydrocarbon fluid to or from a user location such as a denatured alcohol production site or other venue.

The invention will be more fully understood upon consideration of the following detailed description taken in conjunction with the accompanying drawings.

DETAILED DESCRIPTION

In a conventional method for producing a denatured alcohol product, such as denatured ethanol, a mixture of hydrocarbons is combined in a desired ratio with a generally pure, preferably absolute, alcohol such as ethanol in which the hydrocarbons are highly soluble, to thereby produce the denatured alcohol solution. Conventionally, a denatured alcohol solution suited for use as a denatured alcohol fuel contains up to about 15% by weight of hydrocarbons (e.g., gasoline). The denatured alcohol can be stored in a holding vessel such as a tank, prior to transport and use.

Hydrocarbon vapors can be found in empty or partially-filled vehicles for transporting, e.g., hydrocarbons or denatured alcohol, in denatured alcohol storage tanks having a fixed roof, and in underground gasoline storage tanks. In all cases, care must be taken to avoid environmental release of such vapors. The present invention provides apparatus and methods for capturing the vapors in the alcohol, thereby significantly reducing or preventing environmental release.

The skilled person familiar with the disclosure will appreciate that provision of tubing and fluid flow components such as pumps, valves, gauges and the like are within the level of ordinary skill of the skilled artisan. Suggested components are mentioned here as appropriate, but are not considered essential aspects of the apparatus, except where explicitly noted. Also within the level of skill in the art is the ability to determine the hydrocarbon:alcohol ratio in a solution containing both and to calculate how much of either component to add to the solution to achieve the predetermined ratio.

Figure 1:
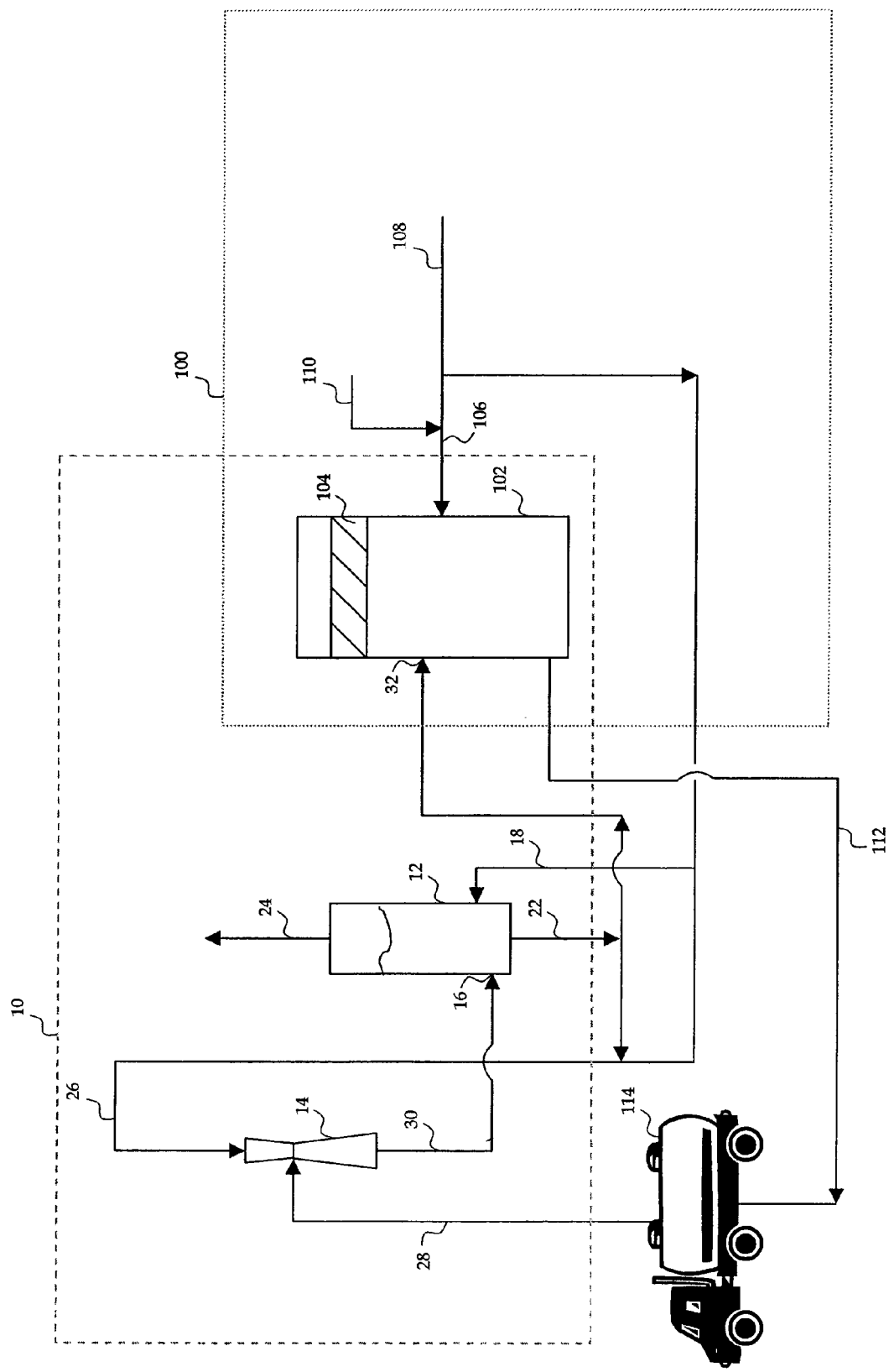
FIG. 1 depicts a first embodiment of a vapor recovery system of the invention in association with a denatured alcohol production system. In the Figures, fluid connections between components are depicted as lines.

FIG. 1 depicts a vapor recovery system 10 in association with a conventional denatured alcohol production system 100. In the denatured alcohol production system 100, a denatured alcohol storage tank 102 having a floating roof 104 is in fluid communication at a first inlet 106 with a source of alcohol 108 and a source of a hydrocarbon mixture 110. Optionally, the alcohol and hydrocarbon sources 108, 110 can enter the storage tank 102 separately. A first outlet 112 from the storage tank 102 provides fluid communication with a vessel 114 that receives the denatured alcohol for subsequent transfer. The vessel 114 is also depicted here as a hydrocarbon vapor source.

The vapor recovery system 10 of FIG. 1 includes a separator 12 and a conventional venturi eductor 14. The separator 12 has a first separator inlet 16 in fluid communication with the venturi eductor 14, a second separator inlet 18 in fluid communication with the alcohol source 108, a first separator outlet 22 in fluid communication with the denatured alcohol production system 100 and a vent 24 to the environment.

The eductor 14 includes a first eductor inlet 26 in fluid communication with the alcohol source 108 and the separator outlet 22, a second eductor inlet 28 in fluid communication with the hydrocarbon vapor source 114, and an eductor outlet 30 in fluid communication with the first separator inlet 16. The eductor 14 further includes an internal mixing chamber (not shown) for mixing the motive alcohol fluid and the hydrocarbon vapors to form an alcohol solution that contains the dissolved vapors.

The alcohol source 108 in fluid communication with the first eductor inlet 26 can be the same source that is in fluid communication with the second separator inlet 18. Further, fluid flows from the first separator outlet 22 to the denatured alcohol storage tank 102 as well as to the first eductor inlet 26. As the Figures show, the storage tank 102 belongs both to the production system 100 and to the recovery system 10.

In operation of the denatured alcohol production system, alcohol is pumped or otherwise urged from the alcohol source 108 toward and into the denatured alcohol storage tank 102. The hydrocarbon mixture from source 110 is added to the alcohol from source 108 to form a solution that resides in the storage tank 102 until the solution is pumped or otherwise urged from the storage tank 102 via outlet 112 into a transport vessel (a tanker truck is shown) 114.

In operation of the associated vapor recovery system 10, a portion of the alcohol pumped or otherwise urged from the alcohol source 108 enters the first eductor inlet 26 under pressure and, being at a higher pressure than the vapors from the vapor source 114, creates a pressure differential that draws vapors from the vapor source 114 into the eductor 14 through the second eductor inlet 28. The vapors and the alcohol mix in the eductor mixing chamber to form a hydrocarbon-alcohol solution and pass from the eductor outlet 30 to the separator 12, mixing there with additional alcohol from the alcohol source. The separator 12 maintains the hydrocarbons in a vapor:liquid equilibrium and thereby substantially limiting escape through the vent 24 to the environment of those non-condensable gases that are insoluble in the hydrocarbon-alcohol solution. The hydrocarbon-alcohol solution is pumped or otherwise urged through the first separator outlet 22 to the denatured alcohol storage tank 102 or to the eductor 14. In the tank 102, the relative proportions of alcohol and hydrocarbons (including hydrocarbons supplied from the hydrocarbon source as well as those recovered by the vapor recovery system) can be adjusted to maintain the desired product proportions. Continuous or periodic monitoring and response ensures product consistency.

Figure 2:
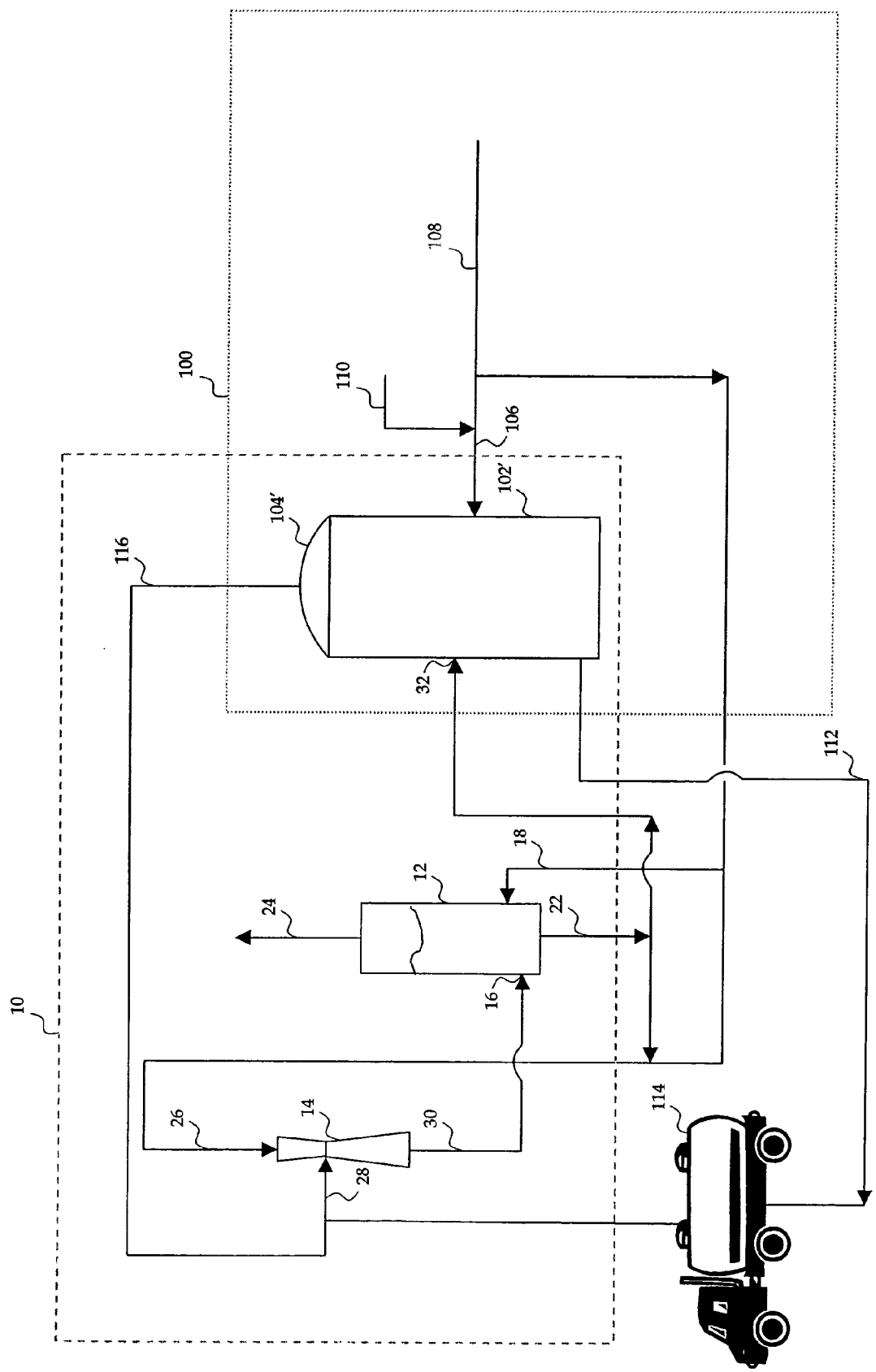
FIG. 2 depicts a second embodiment of a vapor recovery system of the invention in association with a denatured alcohol production system.

In the embodiment of FIG. 1, the tank's self-adjusting roof 104 sits atop the liquid in the tank and leaves no headspace above the liquid. Non-condensable vapors entrained in the alcohol solution are, in this case, vented from the separator 12. The same is not true for the embodiment of FIG. 2, wherein the denatured alcohol tank 102' has a fixed roof 104'. In this related system, fluid communication is established between a second outlet 116 from the storage tank 102' and the second eductor inlet 28 so that vapors in the storage tank 102' and vapors from the vapor source 114 are both drawn into the eductor 14 using an apparatus and a process that can be otherwise identical to those of FIG. 1. It is noted that a close variant of the system of FIG. 2 can eliminate the separator from the system by venting non-condensable insoluble gases from the headspace through a roof vent (not shown) in the fixed-roof storage tank. In this variant, fluid communication is established between the eductor outlet 30 and the second inlet 32 of the denatured alcohol storage tank 102'.

Figure 3:
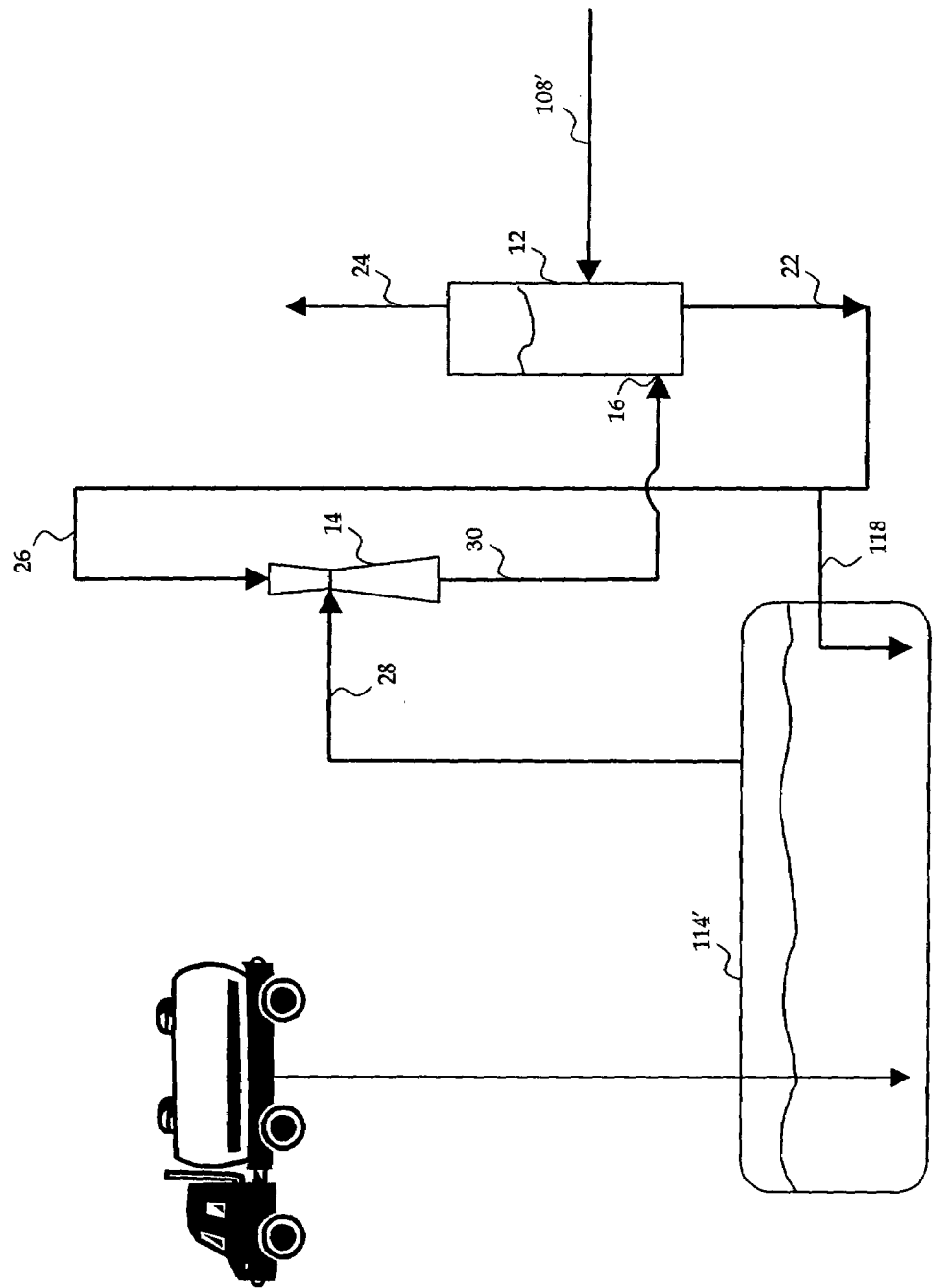
FIG. 3 depicts an embodiment of a vapor recovery system of the invention for use with an underground hydrocarbon storage tank.

Another related embodiment is shown in FIG. 3. The vapor recovery system is generally as in FIGS. 1 and 2. However, in the FIG. 3 embodiment, the vapor source 114' is an underground gasoline storage tank having vapors in the headspace. It is noted that make-up alcohol can be provided into the separator directly from an alcohol source in this embodiment and that the mixture in the separator can provide the motive, high-pressure fluid to the eductor. A fluid conduit 118 connects the separator outlet 22 to the vapor source 114'.

In operation, hydrocarbon vapors are drawn into the eductor, as above. After the hydrocarbon-alcohol solution forms and gases are vented, the solution can be pumped back into the underground storage tank via conduit 118. It is noted, but not shown, that the vapor recovery system of FIG. 3 can, additionally or alternatively, be married to a denatured alcohol production system, as in other embodiments.

The invention is not intended to be limited to the foregoing but rather to embrace all such modifications and variations as come within the scope of the appended claims.

The invention claimed is:

1. An apparatus for recovering hydrocarbon vapors from at least one source of the vapors, the apparatus comprising:
    a source of at least one alcohol liquid;
    a gas-liquid contact device for producing a hydrocarbon-containing alcohol solution from the alcohol and the hydrocarbon vapors;
    a storage container for the hydrocarbon-containing alcohol solution; and
    a vent for venting the non-condensable insoluble gases from the hydrocarbon-containing alcohol solution,
    the source of the alcohol liquid and the storage container being in fluid communication with the gas-liquid contact device.

2. An apparatus as claimed in claim 1 wherein the gas-liquid contact device is selected from the group consisting of an eductor, a co-current flow absorber, and a counter-current flow absorber.

3. An apparatus as claimed in claim 1 further comprising an in-line separator between the gas-liquid contact device and the storage container, the vent being provided on the separator.

4. An apparatus as claimed in claim 1, the apparatus further comprising:
    a denatured alcohol production system having a source of a hydrocarbon mixture,
    the sources and the storage container being in fluid communication with one another.

5. An apparatus as claimed in claim 1, the source of the vapors being selected from a fixed vessel and a mobile vessel.

6. An apparatus as claimed in claim 5, the fixed vessel being selected from the group consisting of a denatured alcohol storage tank and a hydrocarbon-containing storage tank.

7. An apparatus as claimed in claim 5, the mobile vessel being selected from the group consisting of a tanker truck, a rail tank car and a ship.

* * * * *